March 9, 1965
B. E. WRENSCH
3,172,515
MAGNETICALLY RELEASABLE SPRING-ENGAGED
CLUTCH WITH BALANCED THRUST
Filed Feb. 12, 1963
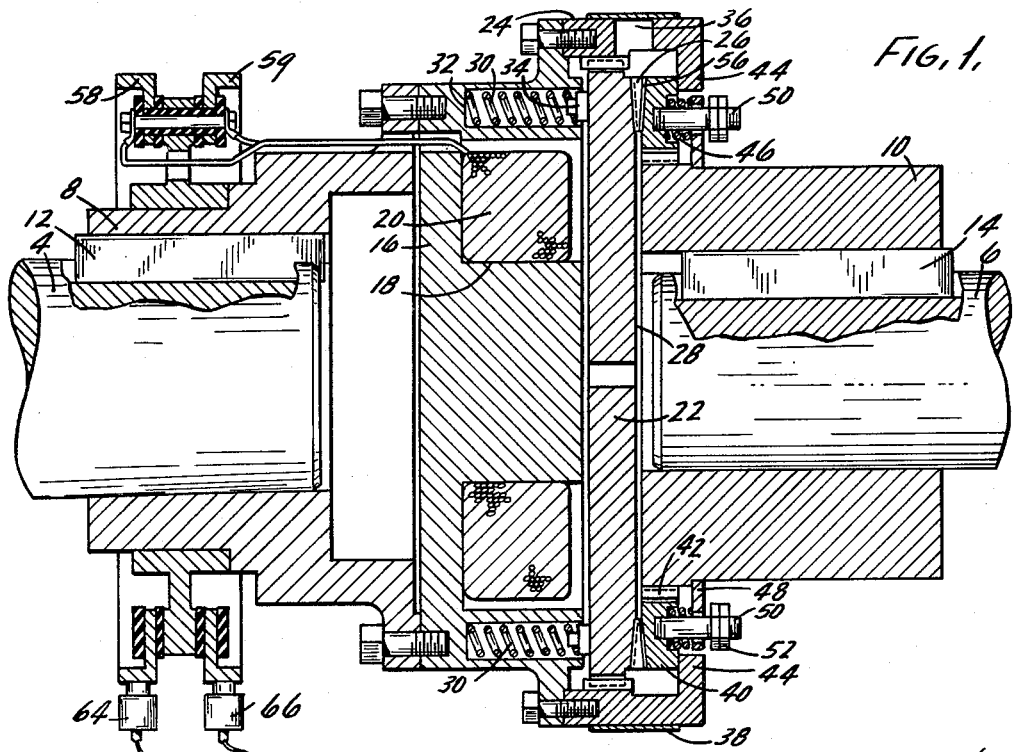
FIG. 1.
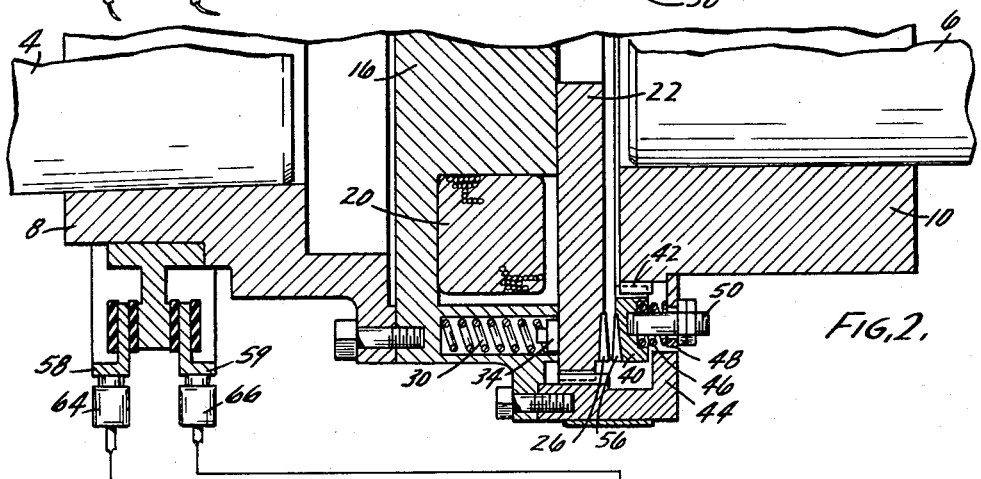
FIG. 2.
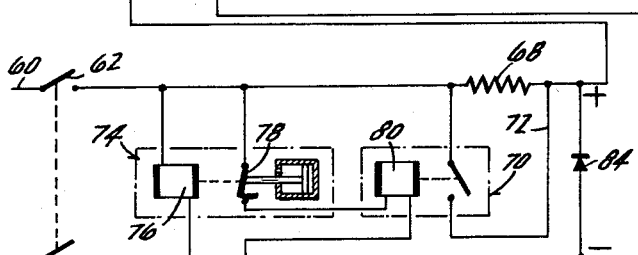
INVENTOR.
BERNARD E. WRENSCH
BY
Wheeler, Wheeler, & Wheeler
ATTORNEYS.

3,172,515
MAGNETICALLY RELEASABLE SPRING-ENGAGED CLUTCH WITH BALANCED THRUST
Bernard E. Wrensch, Brookfield, Wis., assignor to Stearns Electric Corporation, Milwaukee, Wis., a corporation of Wisconsin
Filed Feb. 12, 1963, Ser. No. 257,985
4 Claims. (Cl. 192—90)

This invention relates to a magnetically releasable spring-engaged clutch or brake with balanced thrust.

While the invention is applicable either to a brake or clutch, it is shown illustratively in a clutch with the understanding that by simply securing against rotation the part which is illustrated as a hub on one of the shafts, the device will act as a brake to resist rotation of the other shaft.

In the preferred embodiment, the driving and driven clutch elements have radial teeth to minimize the spring pressure required to maintain the driving connection between such elements. Even so, a substantial bias is required and it is desirable that the thrust be balanced within the clutch itself so as to relieve the driving and driven shafts and the shaft bearings from axial thrust. This is particularly important in a spring-engaged clutch, which requires higher spring pressures than a clutch which is spring-released and magnetically engaged.

In the disclosed embodiment, the coil and magnet rotate with one of the shafts, being provided with slip rings for energizing the coil. A special electrical circuit is preferably employed to provide high voltage initially and immediately to reduce the voltage to a holding value, means also being provided to reduce induced voltage in the clutch coil when the circuit is opened.

The armature retracted by the magnet is subject to the bias of the clutch-engaging springs carried by or housed within the magnet and which urge the armature away from the magnet and into engagement with a complementary clutch element which floats upon a hub mounted upon a shaft aligned with the shaft upon which the magnet is mounted. Not only is the complementary clutch element free to move axially with respect to said hub but it is confined by a stop plate which has a relatively non-magnetic connection to the magnet radially outside of the clutch element, thus balancing the thrust and reaction of the clutch engaging spring means.

In the drawings:

FIG. 1 is a view in axial section of a clutch embodying the invention showing the clutch engaged.

FIG. 2 is a fragmentary view similar to FIG. 1 except that it shows the clutch elements disengaged and diagrammatically illustrates a preferred control circuit.

The shafts 4 and 6 are axially aligned. Either may be the driving shaft. The clutch comprises hubs 8 and 10 upon the respective shafts as shown. The hub 8 and the complementary portion of shaft 4 are tapered but this is not essential to the invention. Both hubs are desirably connected with the respective shafts by means of keys shown at 12 and 14, respectively. The clutch magnet, and the armature which comprises one of the clutch elements, may conveniently be disposed between the hubs.

The annular magnet 16 is connected with hub 8 and has an annular channel at 18 for the winding 20. When the winding is energized, it draws toward the magnet an annular armature 22 which is splined to an external ring 24 that is connected with the magnet.

The armature 22 constitutes one of the clutch elements, being provided with an annular row of generally radial teeth at 26 in that face 28 which is remote from the magnet. Clutch engaging pressure is provided by the bias of compression spring means 30. Optionally, three such springs may be disposed in pockets 32 provided in the magnet and seated at their outer ends upon non-magnetic seat plugs 34 fixed in the armature-clutch element 22.

The ring 24 to which the armature-clutch element 22 is splined may optionally be made of relatively non-magnetic material such as stainless steel. One or more holes 36 may be provided to facilitate use of a feeler gauge to determine spacing between clutch elements. These holes, if used, will be covered by a protective cover 38.

Opposed to the toothed face 28 of the armature-clutch element 22 is a floating, complementary, toothed clutch element 40 which is annular and has splined connection at 42 with the hub 10. It is confined by the annular third clutch element 44, which may constitute a flange or ring 24. The second clutch element is normally spaced from the third element 44 by axially acting compression spring means 46. Each spring 46 seats against a flange 48 fixed to hub 10 and each desirably is guided upon an adjustable motion-limiting stud 50 which is fixed to clutch element 40 and has adjusting nuts 52 which externally engage the flange 48 to limit the movement of the floating clutch element 40 away from the third clutch element 44 under the bias of springs 46. The purpose is to prevent partial engagement of radial teeth 56 and 26 when the clutch is intended to be in the disengaged condition. In this embodiment, the floating clutch element 40 desirably has radial teeth 56 complementary to the teeth 26 of the first clutch element 22.

For energizing the coil 20 the slip rings 58 and 59 are provided, these being mutually insulated and respectively connected with the terminals of the coil. D.C. current supplied through line 60 is controlled by a double pole switch 62 to supply current to the brushes 64 and 66 which engage the slip rings 58 and 59 respectively. In the direct connection between the line and the brush 64 there is a resistor at 68 but when the circuit is first established this resistor is bypassed by means of the relay 70 and bypass line 72. The bypass relay 70 is in turn controlled by a time delay relay 74 having a coil 76 shunted across the line and having its switch 78 in series with the coil 80 of the bypass relay 70. According to the setting of the time delay relay 74, the resistance 68 will be shunted out of the magnet circuit momentarily so that a high inrush current will be applied to the clutch winding 20, the current almost immediately being reduced to a holding value when the time delay relay opens the bypass circuit to require the current to flow through the resistor 68.

Also shunted across the line is a surge suppressing rectifier 84. When the main switch 62 is opened and the circuit to the electromagnetic coil 20 is broken, an electromotive force is generated in the coil in a direction opposite to the line voltage. This E.M.F. traverses the rectifier 84 in one direction only and is dissipated without establishing any opposing oscillation. Thus the induced voltage in the clutch coil is maintained at a relatively low value. The characteristics of the rectifier can be selected in accordance with the line voltage and the current which has to be handled.

In operation, the clutch is normally engaged as shown in FIG. 1, the armature-clutch element being biased away from the magnet 60 by the spring means 30 to engage the teeth 26 with the teeth 56 of the complementary floating clutch element 40. The bias of springs 30 readily overcomes the lesser bias of the springs 46 so that the floating second clutch element 40 is forced against the third clutch element 44. Thus the bias of springs 30 is transmitted through the flange 44 and ring 24 to the magnet 16 where such thrust is equalized by the reaction of the springs against the magnet.

When the coil 20 is energized, it is momentarily supplied with a surge of current adequate to draw the armature 22 quickly to the magnet in opposition to the bias of spring 30, thereby disengaging the teeth 26 from the teeth 56 of the complementary clutch element 40. Once the armature engages the magnet, much less current is required and the time delay relay therefore reduces the voltage sharply within a moment after the coil is energized.

Relieved of the thrust of springs 30, the floating clutch element 40 upon the driven hub 10 moves toward the magnet for a slight distance to establish a narrow gap determined by the adjustment of the nuts 52 on the pins 50.

The opening of the circuit permits instant re-engagement of the clutch element 22 with the clutch element 40, responsive to the bias of the spring means 30.

I claim:

1. The combination with relatively rotatable axially aligned parts, of a first clutch element comprising an armature and having means connecting it for rotative movement with one of said parts, and for axial movement in clutch engaging and disengaging directions with respect to said one part, an electromagnet comprising means energizable for actuating said first clutch element in a clutch disengaging direction, a biasing spring means for actuating said first clutch element in a clutch engaging direction and overcome by the electromagnet means when the latter is energized, a hub on the other of said parts, a second clutch element splined to the hub for rotation therewith and for floating movement axially thereof in directions toward and away from the electromagnet, first stop means having a portion disposed in the path of the second clutch element for limiting the movement of the second clutch element away from the electromagnet, spring means weaker than the biasing spring means aforesaid and operatively biasing the second clutch element for spring-actuated movement in a direction toward the electromagnet, said last spring means being overcome by the biasing spring means of the first clutch element to permit the first clutch element to force the second clutch element against said first stop portion when the electromagnet is deenergized, and a second stop means for limiting the spring actuated movement of the second clutch element to a range in which the first clutch element is disengaged from the second clutch element after the electromagnet is energized.

2. A combination according to claim 1 in which the first stop means includes a ring fastened to the magnet and encircling the floating second clutch element and from which said portion extends inwardly into said path.

3. A combination according to claim 1 in which the said hub has radial projection adjacent the floating second clutch element, the second stop means comprising threaded studs connected with the second clutch element and having means abutting said projection, said studs constituting means for adjustably positioning said second stop means.

4. A combination according to claim 1 in which the first and second clutch elements have complementary generally radial teeth engaged when the first clutch element is actuated by the said biasing spring means in a clutch engaging direction, the spring-actuated movement of the second clutch element causing temporarily continued engagement of said teeth following energization of the electromagnet, the first and second clutch elements moving together toward the magnet until the second clutch element reaches the range limit determined by the second stop means, said first clutch element thereupon being disengaged from the second clutch element by continuing movement toward the magnet after movement of the second clutch element is arrested by the second stop means.

References Cited by the Examiner

UNITED STATES PATENTS

| 2,395,772 | 2/46 | Winther | 192—84 |
| 2,724,474 | 11/55 | Hupp | 192—90 |
| 2,946,418 | 7/60 | Leeson | 192—12.2 |

FOREIGN PATENTS

| 12,954 | 4/04 | Great Britain. |

DAVID J. WILLIAMOWSKY, *Primary Examiner.*